Figure 1:
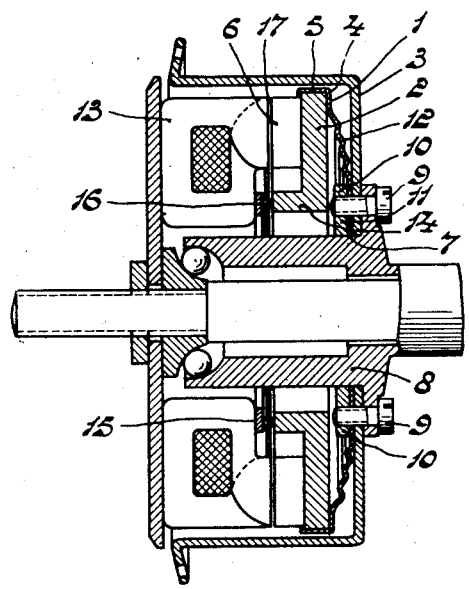

INVENTOR
Albertus Laurentius Josephus Maria Stokmans
By *Fred M Vogel*
Agent

Dec. 28, 1954    A. L. J. M. STOKMANS    2,698,396
ELECTRIC MACHINE OF LOW POWER
Filed Jan. 29, 1952    2 Sheets-Sheet 2

INVENTOR
Albertus Laurentius Josephus Maria Stokmans
By
Agent

United States Patent Office 2,698,396
Patented Dec. 28, 1954

2,698,396

ELECTRIC MACHINE OF LOW POWER

Albertus Laurentius Josephus Maria Stokmans, Eindhoven, Netherlands, assignor to Hartford National Bank and Trust Company, Hartford, Conn., as trustee Application January 29, 1952, Serial No. 268,700

Claims priority, application Netherlands February 5, 1951

5 Claims. (Cl. 310—156)

This invention relates to improvements in or relating to electric machines of low power which are particularly suitable as a bicycle hub dynamo. This application is a continuation-in-part of patent application 232,743 filed June 21, 1951.

Principal patent application 232,743 describes an electric machine of low power, more particularly a bicycle hub dynamo, which is provided with a magnetic circuit comprising two relatively rotatable parts which are arranged side by side in an axial direction and one of which consists of a multipolar permanent magnet which is supported in the hub by resilient means extending in an axial direction between magnet and hub, spacing means between the parts adjusting the desired length of the airgap between these parts and permitting of the relative rotation of the parts by rolling friction. According to the aforesaid application the resilient means for supporting the magnet in the hub may consist of one or more rubber rings or of plate or spiral springs. Since the friction of the rubber rings between hub and magnet should be sufficient to transmit the rotary movement of the hub completely to the magnet, it is necessary for the rubber rings to be under considerable stress between hub and magnet, which makes the fitting of the rings, difficult and expensive. Moreover, a limitation, which is also inherent in the use of springs, consists in that the magnet has a certain limited freedom of motion in the direction of rotation relatively to the hub, owing to which the magnet, in accordance with the position of the pole pieces relative to the sets of iron laminations of the other part of the circuit will periodically lag or lead during rotation of the hub and will rotate in a jolting manner. In addition, the fitting of springs in the limited space between magnet and hub is very difficult.

The present invention has for its object to provide means by which the magnet can be fitted in a cheaper and simpler manner, which manner avoids jolting of the magnet.

In an electric machine according to the invention the resilient means consist of one or more members secured to the hub, which members are resilient in an axial direction and rigid in a tangential direction, the connection between magnet and the member or members being such that the magnet follows the rotation in the last-mentioned direction without slippage.

It will be evident that owing to the resilience of the member or members in an axial direction, the magnet will constantly be urged automatically against the aforesaid spacing means, thus maintaining the required length of the air-gap. Moreover, since the member is rigid in a tangential direction and the magnet is carried along in this direction without slipping, discrepancies between rotation of the hub and of the magnet will not occur. Since the member may be secured to the hub by means of bolts from without the hub, the fitting both of the member and of the magnet is simple, while the connection between magnet and members may, for example, be effected by means of cement or by clamping with sufficient friction. For the sake of simplicity it has furthermore been found advantageous first to connect the magnet to the member and subsequently the assembly to the hub.

The resilient means may, for example, consist of a number of laminations in star-arrangement, one end of which is secured to the hub, whereas the other end carried the magnet. Preferably, however, use is made of a cup-shaped plate having a central aperture whose edge is secured to the hub, whereas the outer edge of the plate is connected to the magnet, the parts of the plate located between the edges being resilient in an axial direction.

As a matter of course, the plate may, if desired, be provided with apertures in a radial direction to enhance the resilience, while retaining the advantage of the plate consisting of one piece. Both in this form and in the form without radial apertures the plate may be corrugated in order to increase the resilience in a radial direction. As an alternative, the outer edge of the plate may be secured to the hub and the inner edge of the central aperture may carry the magnet. Of course, the same holds when using separate plate springs or other resilient members.

A very effective and easy connection between members and magnet is established if the outer edge of the plate consists of a part upturned in an axial direction and embracing the magnet as a bushing. If desired, the edge of this bushing may be flanged around the magnet.

In order that the invention may be more clearly understood and readily carried into effect, it will now be described more fully with reference to the accompanying drawings, given by way of example, of which Fig. 1 is a sectional view of a permanent magnet mounted in the hub of a hub dynamo according to patent application 232,743, which magnet is located in an axial direction adjacent the other part of the magnetic circuit, and resiliently supported in the hub by means of a plate.

The outer edge of the plate carries the magnet and the inner edge of the central aperture is secured to the hub.

Figure 2:
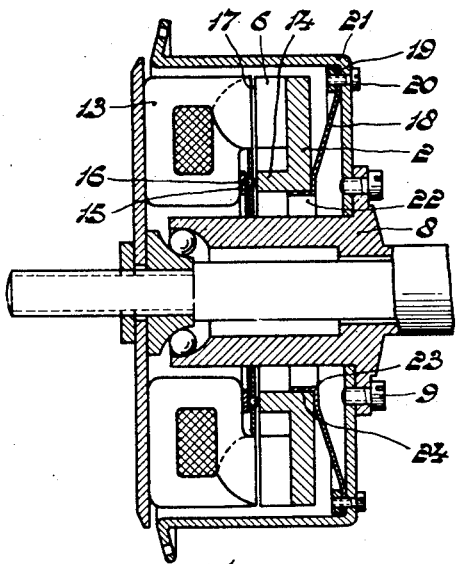

Fig. 2 shows the same cross-section as Fig. 1, but now the outer edge of the plate is secured to the hub and the inner edge of the central aperture carries the magnet.

Figure 3:
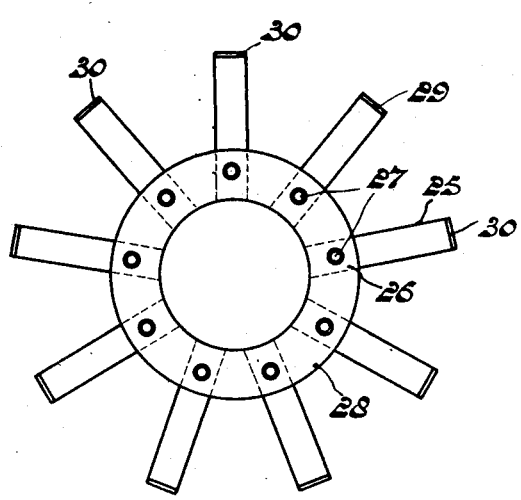
Figure 4:
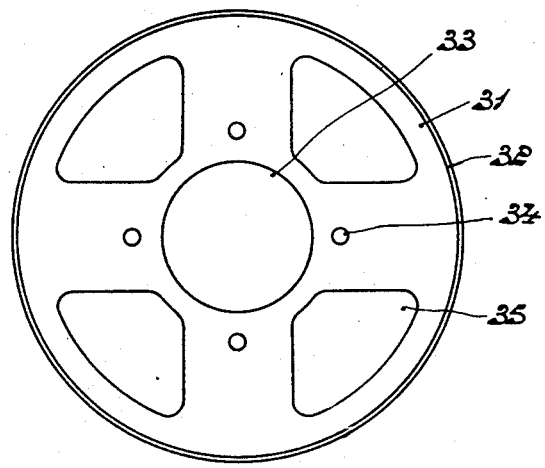

Figs. 3 and 4 respectively show laminated members secured in star-arrangement to the hub, and of a plate which is furnished with radial apertures.

In Fig. 1, the reference numeral 1 designates a cup-shaped brass plate fitted in an axial direction between a magnet 2 and a hub 3. The plate is furnished at its outer edge 4 with a part 5 upturned in an axial direction. Part 5 surrounds the magnet as a bushing and is connected to the magnet by cementing or forcing it between its pole pieces 6 in such a manner as to prevent slippage between both parts under operating conditions. Furthermore, the plate is furnished with a central aperture 7 through which the assembly of magnet and plate is slipped on the central part 8 of the hub. By means of bolts 9, evenly distributed over a given diameter of the hub 3, the plate is secured to the latter. Nuts 10 co-operating with the bolts 9 are provided in a plate 11. The corrugated plate part 12 located between the outer edge 4 and the nuts 10 is resilient in an axial direction and rigid in a tangential direction. Consequently, the magnet is movable to and fro in an axial direction and exactly follows the rotation of the hub during operation.

In this case the two relatively rotatable parts of the magnetic circuit consist of the magnet 2 and a set of iron laminations 13. An annular member 14 consists of magnet steel and is integral with the magnet body 2. This member 14 and an annular member 15 secured to the set of laminations 13 jointly constitute the races for a ball bearing 16 which, as spacing means, adjust the desired length of the air-gap 17 and at the same time permit by rolling friction the relative rotation of the magnet 2 and the set of laminations 13.

In Fig. 2, the plate 18 is secured with its outer edge 19 to the hub 21 by means of bolts 20. Furthermore, the plate 18 has a central aperture 22, the inner edge 23 of which is provided with an axially upturned part 24 which engages the inner wall of the magnet as a bushing and is so connected by cementing to the magnet 2 as to prevent slippage between both parts during operation.

Similarly to the plate shown in Fig. 1 the part of plate 18 located between the outer edge 19 and the inner edge 23 is resilient in an axial direction and rigid in a tangential direction so that the magnet 2 is movable to an fro in an axial direction and accurately follows the rotation of the hub.

The strips 25 in star-arrangement shown in Fig. 3 and secured to the hub are fitted with their ends 26 to a hub (not shown) by means of bolts 27, similarly as in Fig. 1. The nuts co-operating with the bolts 27 are fitted in a plate 28. The strips 25 are flanged in an axial direction at their ends 29, and this flanged part 30 is adapted to embrace a magnet.

The plate 31 shown in Fig. 4 is provided with an outer edge 32 flanged in an axial direction, a central aperture 33 and apertures 34 for attachment to the hub. The plate is provided in a radial direction with apertures 35 by which the resilience is increased in an axial direction, the plate being made in one piece. The mounting of plate 31 may be similar to that of plate 1 shown in Fig. 1.

What I claim is:

1. An electric machine of low power comprising two relatively rotatable members arranged side by side in an axial direction, one of said members having a multipolar permanent magnet, a hub, resilient means extending in an axial direction between said magnet and said hub and supporting said magnet on said hub, spacing means between said relatively rotatable members for determining the minimum length of the air-gap between the members and for permitting relative rotation of the members by rolling friction, said resilient means consisting of a member secured to the hub, which member is resilient in the axial direction and rigid in the tangential direction, and means integral with said member to connect said member to said magnet so that the magnet follows the rotation in said tangential direction without slippage.

2. An electric machine of low power comprising two relatively rotatable members arranged side by side in an axial direction, one of said members having a multipolar permanent magnet, a hub, resilient means extending in an axial direction between said magnet and said hub and supporting said magnet on said hub, spacing means between said relatively rotatable members for determining the minimum length of the air-gap between the members and for permitting relative rotation of the members by rolling friction, said resilient means consisting of a cup-shaped plate having a central aperture whose edges are secured to the hub, which plate is resilient in the axial direction and rigid in the tangential direction, the outer edge of said plate being connected to said magnet so that the magnet follows the rotation in said tangential direction without slippage.

3. An electric machine of low power comprising two relatively rotatable members arranged side by side in an axial direction, one of said members having a multipolar permanent magnet, a hub, resilient means extending in an axial direction between said magnet and said hub and supporting said magnet on said hub, spacing means between said relatively rotatable members for determining the minimum length of the air-gap between the members and for permitting relative rotation of the members by rolling friction, said resilient means consisting of a cup-shaped plate which is corrugated in a radial direction and whose edges are secured to the hub, which plate is resilient in the axial direction and rigid in the tangential direction, the outer edges of said plate being connected to said magnet so that the magnet follows the rotation in said tangential direction without slippage.

4. An electric machine of low power comprising two relatively rotatable members arranged side by side in an axial direction, one of said members having a multipolar permanent magnet, a hub, resilient means extending in an axial direction between said magnet and said hub and supporting said magnet on said hub, spacing means between said relatively rotatable members for determining the minimum length of the air-gap between the members and for permitting relative rotation of the members by rolling friction, said resilient means consisting of a cup-shaped plate which is corrugated in a radial direction and having a central aperture whose edges are secured to the hub, which plate is resilient in the axial direction and rigid in the tangential direction, the outer edges of said plate consisting of an axially upturned part embracing the magnet so that the magnet follows the rotation in said tangential direction without slippage.

5. An electric machine of low power comprising two relatively rotatable members arranged side by side in an axial direction, one of said members having a multipolar permanent magnet, a hub, resilient means extending in an axial direction between said magnet and said hub and supporting said magnet on said hub, spacing means between said relatively rotatable members for determining the minimum length of the air-gap between the members and for permitting relative rotation of the members by rolling friction, said resilient means consisting of a cup-shaped member having outer edges secured to the hub, which plate is resilient in the axial direction and rigid in the tangential direction, said plate having a central aperture whose edges are connected to said magnet so that the magnet follows the rotation in said tangential direction without slippage.

References Cited in the file of this patent

UNITED STATES PATENTS

| Number | Name | Date |
| --- | --- | --- |
| 515,216 | Gutmann | Feb. 20, 1894 |
| 614,608 | Cantono | Nov. 22, 1898 |
| 1,438,361 | Coleman | Dec. 12, 1922 |